Sept. 2, 1958     T. BROWN     2,850,035
PULSATING TYPE AIR-DISPENSING APPARATUS
Filed April 22, 1955     6 Sheets-Sheet 1

Inventor
*Thomas Brown*

By
*Semmes & Semmes*
Attorneys

Sept. 2, 1958            T. BROWN            2,850,035

PULSATING TYPE AIR-DISPENSING APPARATUS

Filed April 22, 1955            6 Sheets-Sheet 2

Inventor
THOMAS BROWN
By
JOHN GIBSON SEMMES
Attorney

Sept. 2, 1958            T. BROWN            2,850,035

PULSATING TYPE AIR-DISPENSING APPARATUS

Filed April 22, 1955            6 Sheets-Sheet 3

Inventor
THOMAS BROWN
By
JOHN GIBSON SEMMES
Attorney

Sept. 2, 1958 T. BROWN 2,850,035
PULSATING TYPE AIR-DISPENSING APPARATUS
Filed April 22, 1955 6 Sheets-Sheet 4

Inventor
THOMAS BROWN
By
JOHN GIBSON SEMMES
Attorney

Sept. 2, 1958 T. BROWN 2,850,035
PULSATING TYPE AIR-DISPENSING APPARATUS
Filed April 22, 1955 6 Sheets-Sheet 5

Inventor
THOMAS BROWN
By
JOHN GIBSON SEMMES
Attorney

Sept. 2, 1958  T. BROWN  2,850,035
PULSATING TYPE AIR-DISPENSING APPARATUS
Filed April 22, 1955  6 Sheets-Sheet 6

Inventor
THOMAS BROWN
By
Semmes & Semmes
Attorneys

United States Patent Office 2,850,035
Patented Sept. 2, 1958

2,850,035

PULSATING TYPE AIR-DISPENSING APPARATUS

Thomas Brown, Sheffield, England, assignor to Pneumatic Components Limited, Sheffield, England Application April 22, 1955, Serial No. 503,218

Claims priority, application Great Britain April 24, 1954

16 Claims. (Cl. 137—224.5)

This inventon relates to air-dispensing apparatus of the type used to charge air under pressure to a receiver, such as a vehicle tyre, by a succession of pulses until the pressure in the receiver has risen by corresponding increments to an amount to which the apparatus has been pre-set. Such apparatus usualy has an audible signal actuated at each pulse, the cessation of the signal serving to indicate that the pressure has reached the pre-set amount.

One object of the invention is to provide an apparatus by which the receiver may be brought to the required pre-set pressure with great accuracy. A further object is to provide the apparatus with a reliable and readily visible indication of the pressure to which it has been pre-set. A still further object is to provide an apparatus with few mechanical movable members, and these only of a simple and reliable character. Other objects and advantages will appear from the subsequent description.

According to the present invention, an apparatus for dispensing air to a receiver comprises a main valve and a subsidiary valve, each adapted to be connected to a main source of pressure air, a delivery connector connected to the main valve and adapted to be applied to a receiver, an adjustable pressure regulator, with a balancing member including a pressure-sensitive element (e. g. a metal bellows, or a resilient diaphragm) adapted to be subjected to pressure as adjusted by the regulator, an air connection from the delivery connector to the balancing member to subject the pressure-responsive element to the air pressure in the connector in opposition to the pressure applied by the regulator, a mechanical connection between the pressure-sensitive element and the subsidiary valve, a motor member, in operative connection with the main valve, a port in the subsidiary valve connected to the motor member, and an exhaust port in the subsidiary valve, movement of the pressure-sensitive element under excess of the adjusted pressure over the air pressure in the connector serving to connect the motor member to the source of pressure air through the subsidiary valve, and reverse movement of the element under excess of air pressure in the connector serving to exhaust the motor member through the subsidiary valve.

In order to provide a cycle with a relatively long charging period followed by a short balancing period, the air connection between the connector and the balancing member preferably includes a choke and a non-return valve serving as a timing member, the non-return valve being so disposed as to shut under excess pressure in the connector, leaving the choke as the communication for that pressure to the balancing member, and the non-return valve opening to allow a reduction of pressure in the connector to be rapidly communicated to the balancing member.

The mechanical connection to the subsidiary valve is preferably provided with means to provide an urge independent of the pressure-sensitive element, e. g. a delicate snap-action toggle, to move that valve towards fully-closed or fully-open position from any intermediate position assumed by that valve under the control of the pressure-sensitive element.

When the connector is applied to a receiver at low pressure the pressure in the connector becomes equal to that in the receiver. If this (as usually will be the case intially) is below the adjusted pressure applied to the balancing member, the subsidiary valve opens and the motor member opens the main valve to deliver air at the pressure of the main supply through the connector to the receiver. This pressure is communicated slowly through the choke to the balancing member, so that an interval elapses before the adjusted pressure on the balancing member is opposed and overcome by the higher pressure on its element. During this interval, the connector continues to charge the receiver, and the interval is ended by the subsidiary valve being moved by the pressure-sensitive element to motor-exhausting position. The main valve now being shut, the new pressure in the receiver is quickly communicated to the balancing member through the open non-return valve. If no balance has yet been reached in the balancing member, the cycle is repeated by the movement of the subsidiary valve to actuate the motor member; and the cycles continue until balance has been reached.

An important feature of the invention is that the application of the pre-set pressure to one side of the pressure-sensitive element, which itself provides for balancing to fine limits, permits the pressure against which the pressure in the receiver is to be balanced to be read directly on a pressure gauge connected in the closed system between the adjustable pressure regulator and the balancing member. The "closed" system should include a slow bleed to atmosphere to permit the system to re-adjust itself when the regulator is adjusted from a higher pre-set pressure to a lower pre-set pressure.

According to a further feature of the invention, the motor member for the main valve serves to actuate the striker of a bell, so that the bell is struck at each opening and/or closing of the main valve, cessation of ringing then serving as an indication that the receiver has been brought to the desired pre-set pressure.

The invention will now be described in greater detail with reference to the accompanying drawings, in which—

Figures 2 to 8 are partly-diagrammatic sections of elements suitable for carrying out the invention, Figure 2 being a pilot pressure regulator; Figure 3 an adjustable pressure regulator; Figure 4 a pressure-balancing member using a diaphragm to operate a subsidiary valve; Figure 6 a choke-tube timing member; Figure 7 a main-valve member with bell.

Figure 13 is a section of toggle mechanism on the line 13—13 of Figure 4; and

Figures 14 and 15 show alternative toggle mechanisms.

Figures 1, 9:
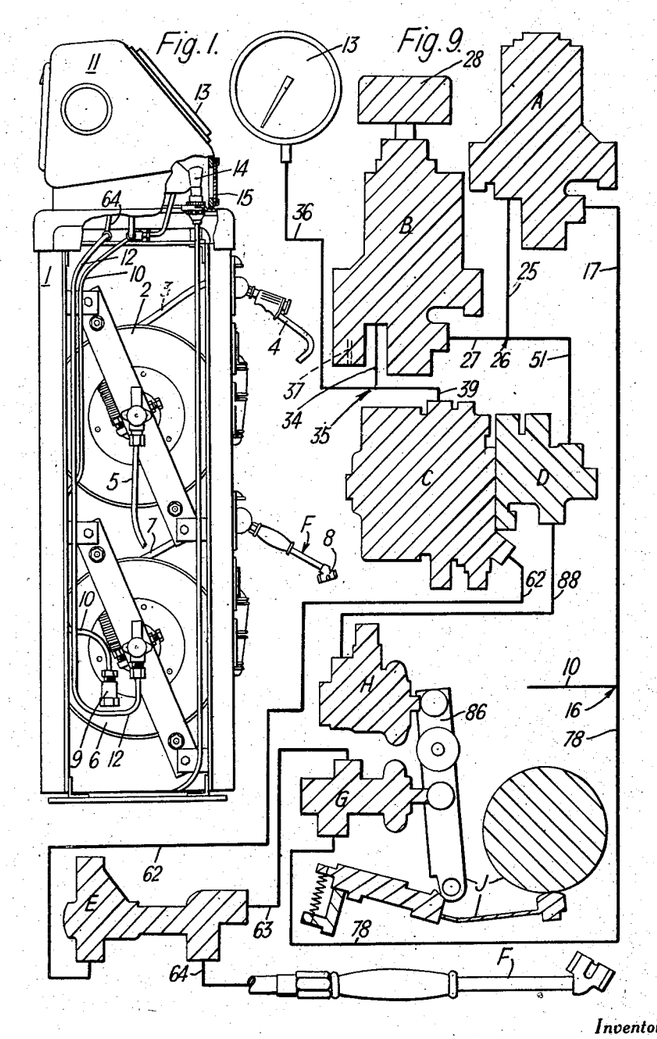
Figure 1 is a side elevation of a dispensing tower (with one side removed) as an example of self-contained equipment embodying the features of the invention.
Figure 9 shows diagrammatically the interconnection of elements as in Figures 2, 3, 4, 6, and 7 in a closed air pressure-balancing system incorporating a pressure gauge.

In Figure 1, a dispensing tower 1 contains a reel 2 for a radiator-filling hose 3 ending in a spout 4, the water being led to the end of the hose on the reel 2 through a supply pipe 5, and a reel 6 for an inflating hose 7 ending in a tyre connector 8. Compressed air is supplied to the tower 1 from an outside source, connected at 9 to a pipe 10 leading to control equipment housed in the top 11 of the tower, and air is led from the top 11 by a pipe 12 to the end of the hose 7 on the reel 6. A pressure gauge 13 is inclined at a convenient angle to be seen by the operator and by the driver of a vehicle, and is illuminated by a light 14, behind a window 15, which may bear any desired legend.

Figures 2, 3, 6, 13, 14:
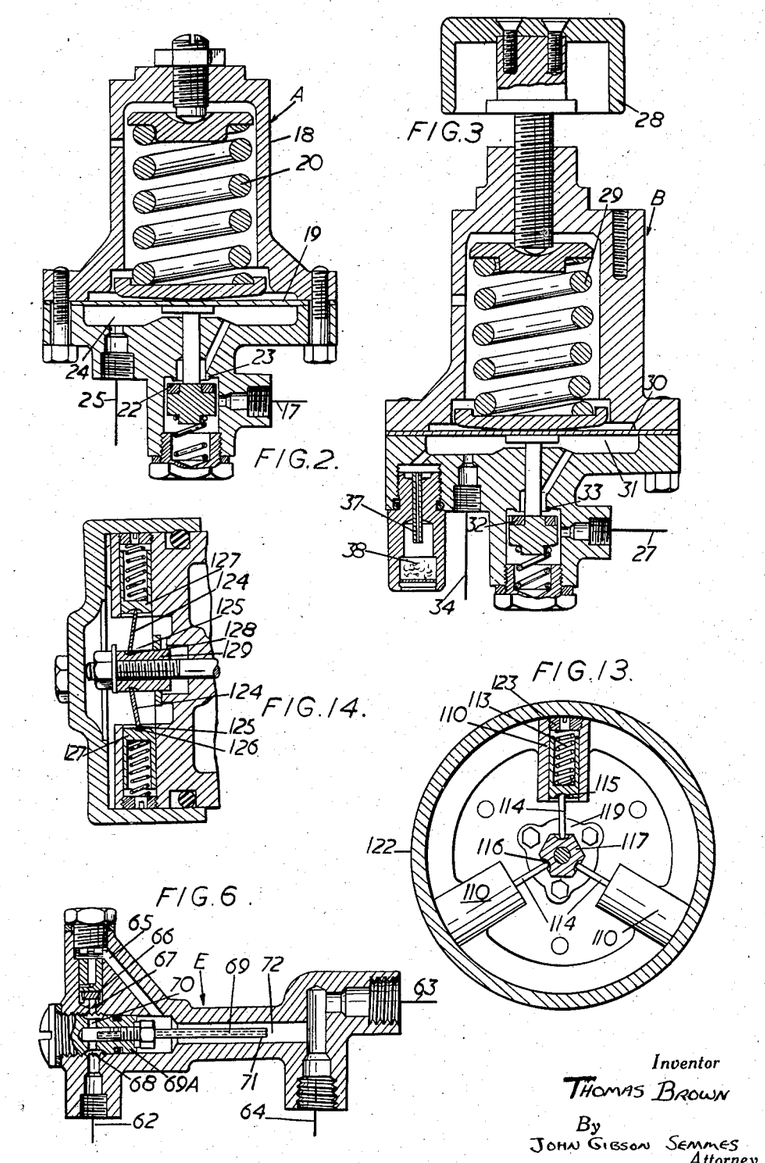
Figure 10:
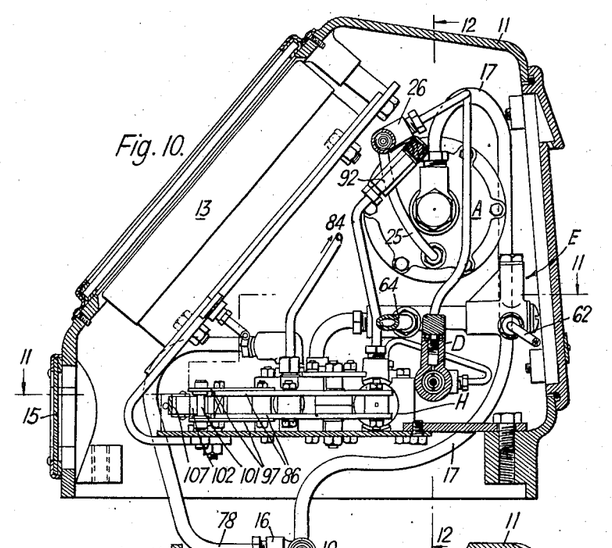
Figure 10 is a section (to a larger scale) of the top of the tower of Figure 1, as viewed from the opposite side, showing the assembly of the elements of the control equipment.

As shown in Figures 9 and 10, the main air pipe 10 branches at 16 to a pipe 17 leading to a pilot pressure regulator A consisting, as shown in Figure 2, of a casing 18 containing a diaphragm 19 steadily loaded on one side by an adjustable spring 20 (accessible only through a cover 21, Figure 12) and exposed on the other side to the pressure of air admitted by a throttle valve 22 that is lifted from an annular seat 23 by an amount depending on the balance reached between the opposed spring-loading and the resultant pressure-loading of the diaphragm 19. An increase or decrease in the supply pressure in the pipe 10 tends respectively to close or open the valve 22, and thus increases or decreases the throttling to produce substantial uniformity of unit pressure on the pressure side 24 of the diaphragm.

Figure 11:
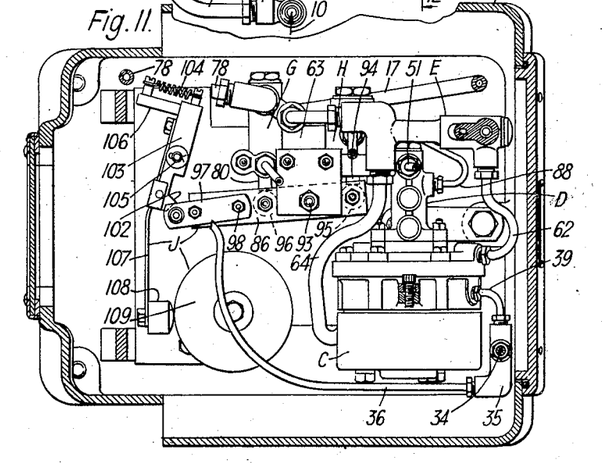
Figure 11 is a sectional plan taken on the line 11—11 of Figure 10.
Figure 12:
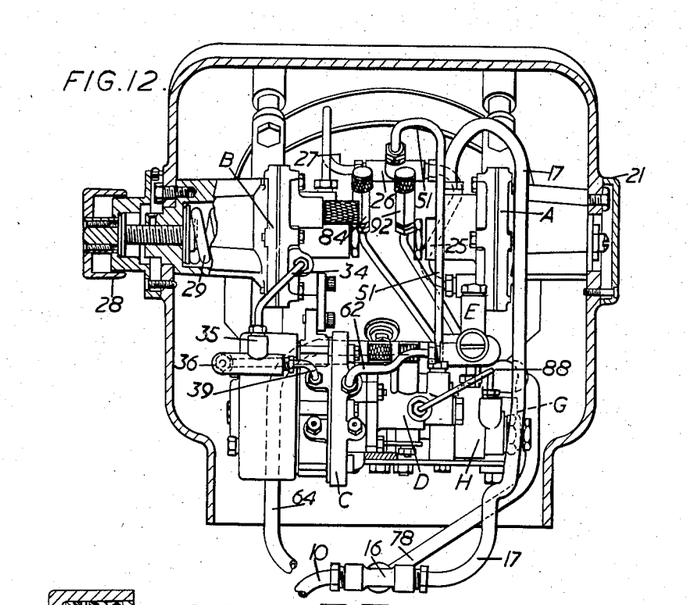
Figure 12 is a sectional elevation taken on the line 12—12 of Figure 10.

It should here be explained that the views of the elements shown in Figures 4 to 8 are "idealised" as regards both the disposition of the elements and the positions at which pipes are connected to the elements, all connections being assumed to be in the same plane (as also in Figure 9) for the sake of clarity. The actual positions of the elements and their connections are shown in Figures 10 to 12.

A pipe connection 25 from the pressure side 24 leads to a T-connection 26 from which a pipe 27 leads to an adjustable pressure regulator B (Figure 3) essentially of the same construction as the pilot regulator A but having manually operated means 28 for adjusting the load applied by a spring 29 to its diaphragm 30. In accordance with the adjustment of the spring 29, the pressure side 31 of the diaphragm 30 so controls the position of a throttle valve 32 in relation to an annular seat 33 that air pressure is supplied to the space 31 to any amount within the capacity of the apparatus, which amount is read directly on the pressure gauge 13, connected to the space 31 by a delivery pipe 34 leading to a T-connection 35 provided with a branch 36 to the gauge 13. This preset pressure serves as a standard against which the tyre pressure is balanced. A bleed 37 (Figure 3) to atmosphere through a filter 38 enables the pressure in the space 31 of the adjustable regulator B and in the gauge 13 to fall when the regulator B is readjusted to deliver air at some lower pressure than that for which it had previously been adjusted.

A pipe connection 39 from the T-connection 35 communicates the pressure of the space 31 of the adjustable regulator B to a space 40 at one side of a resilient diaphragm 41 in a balancing member C (Figure 4), the purpose of which is to balance the final pressure reached in the tyre to be inflated against the standard pressure established by the regulator B inside a closed system that includes the space 40, and—until that balance is reached—to utilise the difference between the main supply pressure from the pipe 10 and the pressure inside the space 40 to control the admission of pressure air to the tyre. At the other side of the diaphragm 41 is a chamber 42 to which the pressure of the main supply is admitted, in a manner to be described below. When so admitted, the main supply pressure deflects the diaphragm 41 against the lesser (standard) pressure inside the space 40. A co-axial plunger 43 connected to the diaphragm 41 passes through two oil-sealed glands 44 separated by a lantern ring 45 communicating to a port 46 exhausting to atmosphere. The free end 47 of the plunger 43 lies in a clearance bore 48 opening inside an annular seat 49 for a lightly spring-loaded subsidiary valve 50 (contained in a housing D), which, when opened by operation of the plunger 43 on excess of pressure in the space 40, permits substantially constant pressure air tapped by a pipe 51 from the T-connection 26 between the regulators A, B to pass by the clearance bore 48 to an outlet port 52 from that bore.

Figures 4, 7, 15:
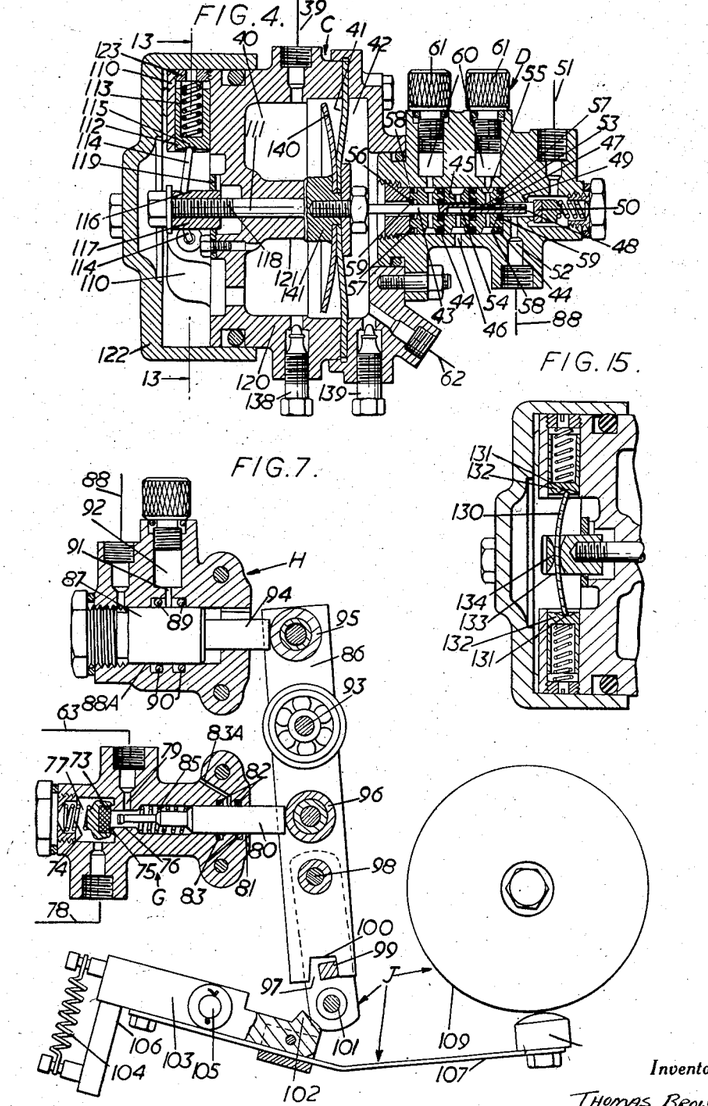

The free end 47 of the plunger 43 is axially bored at 53 and transversely ported at 54 to communicate with the lantern ring 45. Deflection of the diaphragm 41 on excess of pressure in the chamber 42 not only withdraws the end of the plunger 43 to allow the subsidiary valve 50 to seat but brings the end 47 clear of the valve 50 itself to connect the outlet port 52 to the exhaust port 46 via the axial bore 53, the transverse port 54, and the lantern ring 45.

The oil-sealed glands 44 are assembled in a larger bore 55 surrounding the plunger 43 and retained—with the lantern ring 45 interposed—by a gland nut 56. Each gland 44 has itself a lantern ring body and has external annular packing grooves 57 at each end, and also internal grooves 58 at each end to contain sealing rings 59 that bear on the periphery of the plunger 43, which has no shoulders that might give rise to any "piston action" under any of the various pressure conditions to which its periphery is exposed at different parts of its length. Oil supplied from a separate reservoir 60 (with sealed filler cap 61) to the lantern ring body of each gland 44 assists the sealing rings (of oil-resistance material) to remain effective for a long period. Any excessive loss of oil level in any reservoir 60 provides an indication that a faulty ring should be replaced.

The chamber 42 at one side of the diaphragm 41 of the balancing member C is connected by a pipe 62 to a timing member E. The timing member E (Figure 6) has an inlet 63 for main pressure air and an outlet 64 for supplying the flexible hose of the tyre inflator "chuck" F (Figure 9) forming the delivery connector. Connected by a passage 65 to these inlet and outlet connections 63, 64 is a non-return valve 66 that is forced to its seat 67 when main pressure air flows between the connections. The valve 66 leads to one end of a bore 68, which bore leads also to the connection 62 to the balancing member C. The bore 68 contains a plug 68A carrying a fine bore choke tube 69 with one end communicating with the bore 68 by a passage 70 and the other end 71 emerging in a space 72 between the connections 63, 64 and the passage 65. The tube 69, of say 0.010" dia., provides the only route for the supply of main pressure air to the chamber 42 of the balancing member C, and is by-passed on relief of that pressure, since the non-return valve 66 provides a direct outlet from the bore 68 to the outlet 64 via the passage 65.

The fine bore tube 69 may be interchangeable with others of different length and/or bore. In the general use of the apparatus for inflating tyres that are only slightly below their required pressure, two main classes of tyres are encountered, (a) those for automobiles and light motor vehicles, with the pressures in the range 20 to 30 p. s. i., but relatively little range of volume, and (b) those for heavy vehicles and "giant" tyres, with pressures in the higher range 75 to 90 p. s. i. and also of considerably greater volume and range of volume. For the first class, one standard choke tube 69 will probably suffice for the range, giving pulses adding say 1.0 p. s. i. each, and completing inflation in a relatively short time; for the second class, the same choke tube—effecting inflation in a longer time—may be unnecessarily accurate, say to ⅓ p. s. i., but it is still preferable to use it, because it provides a frequent ringing of the bell, which is generally helpful to the operator.

The timing member E receives main pressure air through the inlet pipe 63 from a main valve 73 in a valve unit G (Figure 7) operated by a motor unit H and combined with a bell unit J. The valve 73 is urged by a spring 74 towards an annular seat 75 surrounding a bore 76 that provides a communication to the valve chamber 77, which is provided with an inlet connection 78 from the T-connection 16 connected to the air pipe 10. An outlet 79 of the bore 76 is connected by the pipe 62 to the timing member. A plunger 80 (working in a bore 81 with sealing rings 82 in grooves 83 and an intermediate connection 83A to a sealed oil reservoir 84—shown in Figure 12) is normally urged by a spring 85 clear of the valve 73 but is depressed to unseat the valve by a lever 86 rocked by the stem of a piston 87 of the motor member H. Air at substantially constant pressure is supplied by a pipe 88 from the outlet 52 of the subsidiary valve 50. The piston 87 works in a cylinder 88A with sealing rings 89 in grooves 90 and an intermediate connection 91 to a remote sealed oil reservoir 92 (Figure 12). The lever 86 rocks on a ball-bearing pivot 93 and the piston stem 94 and the main valve plunger 80 are engaged by rollers 95, 96 on the lever, one on each arm at opposite sides of the pivot 93. The piston 87 utilises very little pressure air at each operation and its connection 88 to the subsidiary valve 50 is preferably short and of small bore to reduce the volume thus expended. The subsidiary valve 50 operates as a relay and may be of very small size to operate an ample main valve 73 that has good air passages 78, 76, and 79, and produces very little pressure drop.

Beyond the roller 96 for the plunger 80, the lever 86 carries an extension 97, pivoted at 98, with a projecting stop 99 lying in a wide notch 100 in the end of the lever. The free end of the extension 97 carries a roller 101 movable (on rocking of the lever) past a V-projection 102 on a striker arm 103 urged by a spring 104 about its pivot 105 towards a stop 106. A spring blade 107 clipped to the arm 103 carries a striker 108 for a bell 109. At each stroke of the lever 86 in either direction, the roller 101 on the extension snaps over the V-projection 102 to actuate the striker arm 103 of the bell 109, the play of the projecting stop 99 in the notch 100 permitting this snap action. The lever 86 is the only moving mechanical member in the air control system, apart from the valves enclosed in the system.

With the adjustable regulator B manually set to any desired pressure, which pressure is immediately shown on the gauge 13, a corresponding "standard" pressure is maintained inside the space 40 of the balancing member C.

With a soft diaphragm 41 as the pressure-sensitive element, no noticeable pre-loading of the system arises from the diaphragm itself, so that the pressure gauge 13 used as a visible indicator of the pre-set pressure to be delivered receives an actual pressure that corresponds very closely with that to be delivered.

When the inflator chuck F is applied to the valve of a tyre to be inflated, the chuck will already be under pressure, which pressure is then communicated through the choke tube 69 of the timing member E to the chamber 42 of the balancing member C to keep the subsidiary valve 50 closed to the pressure supply from the pipe 51. The chuck pressure then falls to that of the tyre, as does that in the chamber 42 because of opening of the non-return valve 66, and the subsidiary valve 50 delivers air to the piston 87 of the motor member G for operation of the main valve 73. Main pressure air is thus admitted to the chuck F and to the timing member E by the pipe 63. It is not, however, admitted directly to the balancing member C, but is communicated only relatively slowly through the fine bore choke tube 69 to the chamber 42, during which interval the tyre receives a pulse of pressure air. The diaphragm 41 is not therefore subjected to any violent application of pressure in opposition to the pre-set pressure. The main pressure to the chuck F exceeding the standard pressure in the space 40 of the balancing member C, the diaphragm 41 withdraws the plunger 43 from the valve 50, and the supply piston 87 is cut off, the piston then exhausting through the pipe 88, the bore 53 of the plunger 43, the lantern ring 45, and the outlet port 46. The main supply pressure in the chamber 42 leaks back quickly to the chuck F through the non-return valve 66, and the pressure in the chamber 42 becomes equal to the pressure of the tyre as increased by the one pulsation through the main valve 73, which has by this time been closed by exhausting of the piston 87.

The cycle is repeated so long as the tyre pressure falls short of the standard pressure, the excess of the standard pressure again causing air to be passed to the piston 87 over an interval determined by the time taken for the main pressure to be transmitted through the fine bore choke tube 69 to the chamber 42. At each pulsation, a substantial increment of tyre pressure results, until the pressure in the tyre communicated to the chamber 42 balances the pre-set pressure in the space 40.

At each operation of the piston 87 (i. e. at both admission and exhaust), the rocking of the lever 86 operates the striker arm 103, so that the bell 109 is struck twice for each inflation pulse. The rate of striking is substantially constant during the period of inflation, i. e., there is no pronounced slowing of the rate in the later stages of inflation, although the last ring may be delayed while the apparatus is deciding if one more pulse of air is possible or not.

Figures 4 and 13 show means for preventing the subsidiary valve 50 from remaining in a slightly-open position when a condition of near-balance has been reached between the forces operating on the diaphragm 41 as the predetermined pressure is approached in the tyre, and therefore ensures that a final pulse is concluded to achieve that pressure in the tyre, and concluded in much the same interval of time as the preceding pulse or pulses. Three radial cylinders 110 surround an extension 111 of the plunger 43 but on the opposite side of the diaphragm 41, and each has a plunger 112 urged inwardly by a spring 113. A toggle bar 114 extends between a recess 115 in the inner end of each plunger 112 and a corresponding recess 116 in a 6-sided sleeve 117 threaded on a screwed part 118 of the extension 111 and locked by a plate 119. The recesses 115 in the plunger 112 lie intermediately (in the axial direction of the extension 111) of the limiting positions of the recesses 116 in the sleeve 117. The toggles 114 thus tend to assume a lightly inclined position to one side or the other of a direct radius from the sleeve 117, and the spring urge on the plungers 112 produces a lengthwise component of thrust on the sleeve 117 from the toggles 114. As the sleeve 117 moves (even slowly) with the diaphragm 41 to bring the toggles 114 into direct radii, the toggle position is unstable, and the toggles snap over to complete the movement.

The cylinders 110 are formed in a housing 120 providing the space 40, and from which a long bearing 121 extends to guide the extension 111. Rotation of the sleeve 117 provides for adjustment of the longitudinal position of the recesses 116 with respect to the recesses 115 in the ends of the plungers. If the sleeve 117 has six recesses 116, it may be rotated in stages of one-sixth of a turn and locked by the plate 119 after which the toggles 114 may be sprung in place. Each toggle 114 preferably has rounded ends to fit flat conical recesses, 115, 116, needle roller bearings being suitable as toggles. With the parts suitably hardened, little wear results, but in any case the spring plungers 112 automatically take up wear.

A cover 122 encloses the cylinders 110 and retaining plugs 123 for the springs 113.

A similar toggle action may be obtained as shown in Figure 14, by a pair of toggle plates 124, with narrow V-edges 125 fitting wider V-grooves 126 in a pair of spring plungers 127 and corresponding grooves 128 in a sleeve 129. Again, as shown in Figure 15, the toggle action may be provided by a V-edged spring plate 130 extending between V-grooves 131 in a pair of plungers 132 and passing through a round-edged slot 133 in a head 134, the plate 130 buckling in one direction or the other from a mid-position under the urge of the plungers.

An advantage of a closed air system is that the balance may be struck to fine limits, since the diaphragm 41 and the subsidiary valve 50 may readily be constructed to move under very small differences of pressure on the two sides of the diaphragm. A further advantage is that the adjusted pressure in the closed system may be accurately read by the pressure gauge 13, so disposed as to be readily observed and checked to see that it reads to the desired pre-set pressure.

The two pressure regulators A, B, balancing member C, valve unit D, timing member E, and valve-motor-and-bell unit G, H, J form a compact assembly in the top 11 of the tower 1, but could equally well be housed in other forms of equipment, e. g. equipment to be carried on a wall.

The use of a choke tube 69 as the basis of the timing device E and the relay operation of the main valve 73 by a very light subsidiary valve 50 directly responsive to the diaphragm 41 enables the pulses to be effected with precision, particularly as to duration. This affords close control over the amount of each inflation pulse, so that the final pulse brings the inflation pressure into close conformity with the pre-set pressure.

The steady (but adjustable) loading by the compression spring 29 of the adjustable regulator B serves to minimise the effect of any variations of pressure in the main pipe 10, and assists in maintaining the closed pressure system at the required pre-set value.

Figure 5:
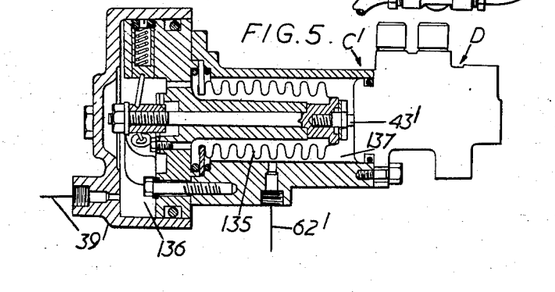
Figure 5 an alternative to Figure 4 using a bellows in the balancing member.

Figure 5 shows a metal bellows 135 as the pressure-sensitive element of a balancing member C', the bellows being subjected internally to the pre-set pressure applied to a space 136 by a pipe 39' from the closed air system, and externally to the alternation of main pressure and tyre pressure applied to chamber 137 by a pipe 62' from the timing member. Toggles 114, as in Figure 4, cause the bellows 135 and plunger 43' to snap over, so that the subsidiary valve in the unit D is in either fully-closed or fully-open position.

Figure 4 shows drain valves 138, 139 for the space 40 and the chamber 42, to remove any moisture accumulating from the atmospheric air passing through the system, which otherwise might affect the rate of the delivery pulses, by reducing the volume of the space and chamber. Though not shown in Figure 5, similar drain valves should preferably be provided for the space 136 and the chamber 137.

In Figure 4, the diaphragm 41 is backed by a convex plate 140 on the side opposite to the chamber 42 to which the pressure air is supplied, and a stop is provided by the end of the bearing 121 to receive the backing plate boss 141 in the event of movement beyond that required for normal working of the diaphragm. The diaphragm 41, preferably of rubber sheet, is capable of withstanding excessive loading on the pressure-air side, i. e., in the chamber 42, and is thus less prone to damage than is a metal bellows in the event of failure of the usual safety valve in the outside supply system.

Figure 8:
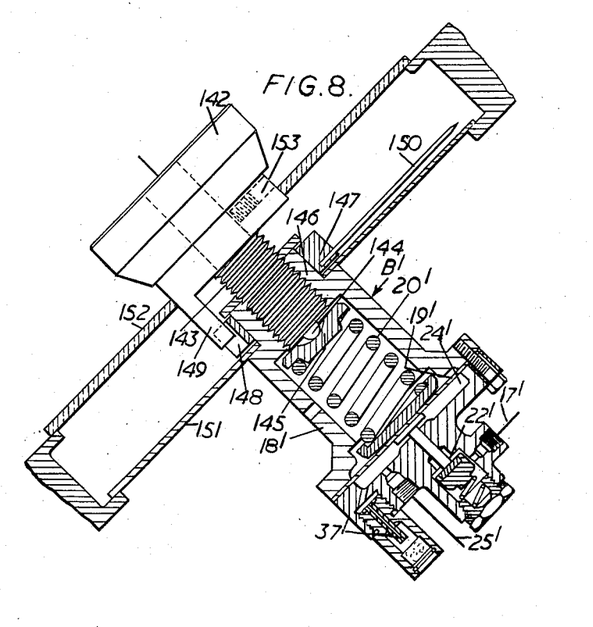
Figure 8 an adjustable pressure regulator with dial and pointer, as an alternative to Figure 3.

In Figure 8, is shown an alternative means for pre-setting the pressure to be delivered. A unit B', to replace the unit B and pressure gauge 13 previously described, comprises a casing 18' containing a diaphragm 19' loaded by a spring 20' to control a throttle valve 22' between the supply pipe 17' and the chamber 24', thus regulating the pressure of the air supplied from the chamber 24' by the outlet pipe 25' to the balancing member. A knob 142 is secured to a stem 143 with a quick-pitch thread and ending in a rounded projection 144 to bear on a plate 145 at the end of the spring 20'. Loosely mounted on a boss 146 of the casing 18' is a collar 147 with a notch 148 to receive a projection 149 from the knob 142. A pointer 150 is carried by the collar 147 and is rotated over a scale on a back plate 151.

The pointer 150 moves close to a sealed plate 151 behind it, and is visible through a transparent cover 152 through which the knob 142 passes; or alternatively the pointer moves close to the cover 152, which is then marked with a scale to form a dial. The scales preferably read in amounts of pressure equivalent to the setting of the spring. To enable the full range of pressure to be included within one complete turn of the pointer 150 with respect to the dial, the screwed stem 143 should have an appropriate quick-pitch, the full range of pressure obtainable by setting the spring 20' then being accomplished within one full turn of the knob 142.

The knob 142 is rotatable with respect to the stem 143 and secured to it by a grub-screw 153, to permit the pointer 150 to be adjusted to the "zero" of the scale.

As with the regulator B, the regulator B' includes a slow bleed 37' to atmosphere to permit re-setting of the system to some lower pre-set pressure than that to which it had previously been set.

The toggles 114, and the bellows 135 (when used), tend to pre-load the balancing system slightly, since some mechanical effort is required to overcome the toggle springs 113 or the stiffness of the bellows. In consequence, the calibration of the gauge 13 must make allowance for this slight pre-loading to enable the gauge to read in actual terms of the pressure in the tyre to be obtained by the balancing of the pressure conditions in the balancing member C.

What I claim is:

1. Apparatus for dispensing air to a receiver comprising a main valve and a subsidiary valve, each adapted to be connected to a main source of pressure air, a delivery connector connected to the main valve and adapted to be applied to a receiver, an adjustable pressure regulator, with a balancing member including a pressure-sensitive element subjected to pressure as adjusted by the regulator, an air connection from the delivery connector to the balancing member to subject the pressure-sensitive element to the air pressure in the connector in opposition to the pressure applied by the regulator, a mechanical connection between the pressure-sensitive element and the subsidiary valve for opening the subsidiary valve on movement of the pressure-sensitive element under excess of the adjusted pressure over the air pressure in the connector and for allowing closure of the subsidiary valve on reverse movement of the element under excess of air pressure in the connector, a motor member in operative connection with the main valve, a port in the subsidiary valve connected to the motor member for the passage of pressure air through the subsidiary valve to the motor member to actuate that member to open the main valve, and an exhaust port in the subsidiary valve for the passage of exhaust air from the motor member through the subsidiary valve as that valve closes to render the motor member inoperative and allow the main valve to close.

2. Air-dispensing apparatus as in claim 1, comprising a pressure gauge connected to indicate the pressure as adjusted by the pressure regulator and to be balanced by the pressure in the connector.

3. Air-dispensing apparatus as in claim 2, comprising a slow bleed to atmosphere in the adjusted pressure supply to the balancing member.

4. Air-dispensing apparatus as in claim 2, comprising a slow bleed to atmosphere in the adjustable pressure regulator.

5. Air-dispensing apparatus as in claim 1, comprising a scale of amounts of pressure equivalent to the setting of the pressure regulator, and a pointer movable with respect to the scale upon setting of the regulator.

6. Air-dispensing apparatus as in claim 5, comprising a slow bleed to atmosphere in the adjustable pressure regulator.

7. Apparatus for dispensing air to a receiver comprising a main valve and a subsidiary valve, each adapted to be connected to a main source of pressure air, a delivery connector connected to the main valve and adapted to be applied to a receiver, an adjustable pressure regulator, with a balancing member including a pressure-sensitive element subjected to pressure as adjusted by the regulator, an air connection from the delivery connector to the balancing member to subject the pressure-sensitive element to the air pressure in the connector in opposition to the pressure applied by the regulator, a mechanical connection between the pressure-sensitive element and the subsidiary valve for opening the subsidiary valve on movement of the pressure-sensitive element under excess of the adjusted pressure over the air pressure in the connector and for allowing closure of the subsidiary valve on reverse movement of the element under excess of air pressure in the connector, a motor member in operative connection with the main valve, a port in the subsidiary valve connected to the motor member for the passage of pressure air through the subsidiary valve to the motor member to actuate that member to open the main valve, an exhaust port in the subsidiary valve for the passage of exhaust air from the motor member through the subsidiary valve as that valve closes to render the motor member inoperative and allow the main valve to close and a timing member, including a choke and a non-return valve, between the connector and the balancing member, the non-return valve being so disposed as to shut under excess pressure in the connector, leaving the choke as the communication for that pressure to the balancing member, and the non-return valve opening to allow a reduction of pressure in the connector to be rapidly communicated to the balancing member.

8. Apparatus for dispensing air to a receiver comprising a main valve and a subsidiary valve, each adapted to be connected to a main source of pressure air, a delivery connector connected to the main valve and adapted to be applied to a receiver, an adjustable pressure regulator, with a balancing member including a pressure-sensitive element subjected to pressure as adjusted by the regulator, an air connection from the delivery connector to the balancing member to subject the pressure-sensitive element to the air pressure in the connector in opposition to the pressure applied by the regulator, a mechanical connection between the pressure-sensitive element and the subsidiary valve for opening the subsidiary valve on movement of the pressure-sensitive element under excess of the adjusted pressure over the air pressure in the connector and for allowing closure of the subsidiary valve on reverse movement of the element under excess of air pressure in the connector, the mechanical connection including means to provide an urge independent of the pressure-sensitive element, to move that valve towards fully-closed or fully-open position from any intermediate position assumed by that valve under the control of the pressure-sensitive element, a motor member in operative connection with the main valve, a port in the subsidiary valve connected to the motor member for the passage of pressure air through the subsidiary valve to the motor member to actuate that member to open the main valve, and an exhaust port in the subsidiary valve for the passage of exhaust air from the motor member through the subsidiary valve as that valve closes to render the motor member inoperative and allow the main valve to close.

9. Air-dispensing apparatus as in claim 8, wherein a toggle mechanism is used to provide the independent urge.

10. Apparatus for dispensing air to a receiver comprising a main valve and a subsidiary valve, each adapted to be connected to a main source of pressure air, a delivery connector connected to the main valve and adapted to be applied to a receiver, an adjustable pressure regulator, with a balancing member including a pressure-sensitive element subjected to pressure as adjusted by the regulator, an air connection from the delivery connector to the balancing member to subject the pressure-sensitive element to the air pressure in the connector in opposition to the pressure applied by the regulator, a mechanical connection between the pressure-sensitive element and the subsidiary valve for opening the subsidiary valve on movement of the pressure-sensitive element under excess of the adjusted pressure over the air pressure in the connector and for allowing closure of the subsidiary valve on reverse movement of the element under excess of air pressure in the connector, a motor member in operative connection with the main valve, a port in the subsidiary valve connected to the motor member for the passage of pressure air through the subsidiary valve to the motor member to actuate that member to open the main valve, an exhaust port in the subsidiary valve for the passage of exhaust air from the motor member through the subsidiary valve as that valve closes to render the motor member inoperative and allow the main valve to close, a bell, and a striker, the striker being actuated by the motor member for the main valve.

11. Apparatus for dispensing air to a receiver comprising a main valve and a subsidiary valve, each adapted to be connected to a main source of pressure air, a delivery connector connected to the main valve and adapted to be applied to a receiver, an adjustable pressure regulator, with a balancing member including a diaphragm subjected to pressure as adjusted by the regulator, an air connection from the delivery connector to the balancing member to subject the diaphragm to the air pressure in the connector in opposition to the pressure applied by the regulator, a mechanical connection between the diaphragm and the subsidiary valve for opening the subsidiary valve on movement of the diaphragm under excess of the adjusted pressure over the air pressure in the connector and for allowing closure of the subsidiary valve on reverse movement of the diaphragm under excess of air pressure in the connection, a motor member in operative connection with the main valve, a port in the subsidiary valve connected to the motor member for the passage of pressure air through the subsidiary valve to the motor member to actuate that member to open the main valve, and an exhaust port in the subsidiary valve for the passage of exhaust air from the motor member through the subsidiary valve as that valve closes to render the motor member inoperative and allow the main valve to close.

12. Air-dispensing apparatus as in claim 11, comprising a stop for the diaphragm on the side opposite to that to which pressure air is supplied.

13. Apparatus for dispensing air to a receiver comprising a main valve and a subsidiary valve, each adapted to be connected to a main source of pressure air, a delivery connector connected to the main valve and adapted to be applied to a receiver, an adjustable pressure regulator, with a balancing member including a metal bellows subjected to pressure as adjusted by the regulator, an air connection from the delivery connector to the balancing member to subject the bellows to the air pressure in the connector in opposition to the pressure applied by the regulator, a mechanical connection between the bellows and the subsidiary valve for opening the subsidiary valve on movement of the bellows under excess of the adjusted pressure over the air pressure in the connector and for allowing closure of the subsidiary valve on reverse movement of the bellows under excess of air pressure in the connection, a motor member in operative connection with the main valve, a port in the subsidiary valve connected to the motor member for the passage of pressure air through the subsidiary valve to the motor member to actuate that member to open the main valve, and an exhaust port in the subsidiary valve for the passage of exhaust air from the motor member through the subsidiary valve as that valve closes to render the motor member inoperative and allow the main valve to close.

14. Air-dispensing apparatus as in claim 13, comprising a stop for the bellows on the side opposite to that to which pressure air is supplied.

15. Apparatus for dispensing air to a receiver comprising a main valve and a subsidiary valve, each adapted to be connected to a main source of pressure air, a delivery connector connected to the main valve and adapted to be applied to a receiver, a pilot pressure regulator, an adjustable pressure regulator with an air connection to the pilot pressure regulator, to receive air as adjusted in pressure by the pilot regulator, with a balancing member including a pressure-sensitive element subjected to pressure as adjusted by the regulator, an air connection from the delivery connector to the balancing member to subject the pressure-responsive element to the air pressure in the connector in opposition to the pressure applied by the regulator, a mechanical connection between the pressure-sensitive element and the subsidiary valve for opening the subsidiary valve on movement of the pressure-sensitive element under excess of the adjusted pressure over the air pressure in the connector and for allowing closure of the subsidiary valve on reverse movement of the element under excess of air pressure in the connector, a motor member in operative connection with the main valve, a port in the subsidiary valve connected to the motor member for the passage of pressure air through the subsidiary valve to the motor member to actuate that member to open the main valve, and an exhaust port in the subsidiary valve for the passage of exhaust air from the motor member through the subsidiary valve as that valve closes to render the motor member inoperative and allow the main valve to close.

16. Air-dispensing apparatus as in claim 15, wherein the inlet to the subsidiary valve is connected to the pilot pressure regulator to receive air from that regulator.

References Cited in the file of this patent

UNITED STATES PATENTS

| | | |
|---|---|---|
| 2,042,190 | Ragan | May 26, 1936 |
| 2,063,783 | Beath | Dec. 8, 1936 |
| 2,537,869 | Willson | Jan. 9, 1951 |
| 2,666,446 | Woodford | Jan. 19, 1954 |